(12) United States Patent
Garcia

(10) Patent No.: US 6,401,415 B1
(45) Date of Patent: Jun. 11, 2002

(54) DIRECT LAMINATED FLOOR

(75) Inventor: Eugenio Cruz Garcia, Gandia (ES)

(73) Assignee: Industrias Auxiliares Faus, S.L., Gandia (ES)

( * ) Notice: Subject to any disclaimer, the term of this patent is extended or adjusted under 35 U.S.C. 154(b) by 0 days.

(21) Appl. No.: 09/460,117

(22) Filed: Dec. 13, 1999

(30) Foreign Application Priority Data

Nov. 5, 1999 (ES) ............................................. P-9902432

(51) Int. Cl.⁷ ................................................ E04F 15/00
(52) U.S. Cl. ......................... 52/311.1; 52/313; 52/315; 52/316; 52/392
(58) Field of Search ........................ 52/314, 316, 313, 52/315, 392, 311.1; 428/15, 33, 50, 83, 542.2

(56) References Cited

U.S. PATENT DOCUMENTS

| | | | |
|---|---|---|---|
| 2,108,226 A | | 2/1938 | Johnston |
| 3,878,030 A | * | 4/1975 | Cook ........................ 428/45 |
| 4,290,248 A | * | 9/1981 | Kemerer et al. ........... 52/314 X |
| 4,864,790 A | * | 9/1989 | Liaret ........................ 52/316 X |
| 5,226,273 A | * | 7/1993 | Burke ........................ 52/390 |
| 5,314,554 A | * | 5/1994 | Owens ........................ 156/154 |
| 5,713,173 A | * | 2/1998 | Von Langsdorff et al. .... 52/316 X |
| 5,736,227 A | * | 4/1998 | Sweet et al. ................. 428/192 |
| 5,858,160 A | | 1/1999 | Piacente et al. |
| 5,961,903 A | | 10/1999 | Eby et al. |
| 6,114,008 A | | 9/2000 | Eby et al. |

* cited by examiner

Primary Examiner—Carl D. Friedman
Assistant Examiner—Jennifer I. Thissell
(74) Attorney, Agent, or Firm—Long Aldridge & Norman LLP

(57) ABSTRACT

New direct laminated floor, of the kind that contain, on their surface, cellulose sheets impregnated in polymerisable resins, on which some characteristics have been drawn and where, once pressed and mechanised, the finished strips have an offset/sunk area on the peripheral edge and the optic/tactile texture of the surface corresponds and adapts to the characteristics drawn on the cellulose sheets.

For application in the construction industry.

49 Claims, 1 Drawing Sheet

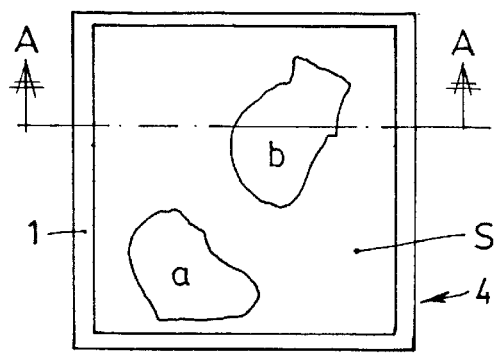
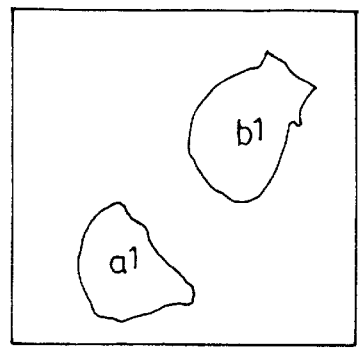
Fig. 2  Fig. 1
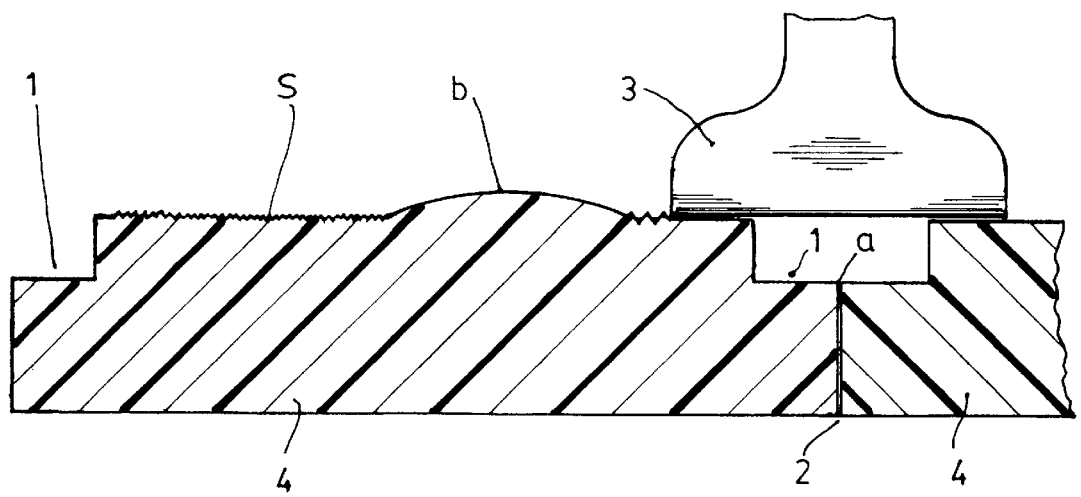
Fig. 3

DIRECT LAMINATED FLOOR

BACKGROUND OF THE INVENTION

It is well known to hot press cellulose sheets (papers) impregnated in phenol or melamine (or similar-resins) with wooden boards or panels (plus other components specified by the manufacturer) to produce products such as boards, laminated boards, panels, and direct laminated floors that imitate wood, ceramic, and natural stone. Such imitation materials are mainly used for floors.

If melamine is used, and if the product is to have a single work surface (for example a floor), the melaminized board that comes from the press typically has a surface area between 3 and 8 square meters. Such boards are then cut into units (strips) approximately 1,200×200 mm. Each unit is beneficially tongued and grooved for ready installation. The result is a decorative and resistant paving that imitates wood, ceramic or natural stone.

Such known products have two significant defects:

1. They are not very wear resistant.
2. They do not closely imitate natural products (such as ceramic and wood).

The applicant has investigated reason why such products are not very wear resistant. It has been observed that premature aging (wear) begins at or near the perimeter edges and/or along tongue and groove lines.

The known products have an even (level) surface texture such that the user, such as a pedestrian, treads (the soles of his shoes make contact) equally on the center of a tile on its perimeter edge. But, since the perimeter edge is the weakest area it deteriorates first.

The applicant has also investigated the reason for the second defect. He has reached the conclusion that if an imitation product is not a suitable imitation of a natural product, it is at least partially because the imitation's surface texture, both optical and tactile, have design errors.

In current products, a decorative surface effect is achieved by a design that is printed on an impregnated (by resin) paper. However, the surface texture of products with such printed designs is typically monotonous (flat) over the whole surface. This is because the press mold produces a flat surface.

Thus, while a surface design represents the different characteristics (line, color) of a natural product, the texture (relief) provided by the press mold does not match a natural product's surface level variations, both with regard to sight and to touch.

SUMMARY OF THE INVENTION

One object of the invention is to overcome the wear problem of products (tile, strip, board, etc.), which typically have a polygonal shape such as a rectangle or square. The object is achieved by providing a relieved perimeter. That is, a product's perimeter edge is contoured to be a few tenths of a millimeter below the rest of the product's surface. Thus, when a user treads on the product the user's soles do not rest on the perimeter edges. Likewise friction or wear caused by other agents coming into contact with the product is avoided.

Another object of this invention is to overcome the problem wherein a product's surface (such as that of a tile, a strip, or a board) is totally even or monotonous. This object is achieved by producing a product having a surface texture that corresponds and adapts to a printed design. The result is close optical and textural identifications with a natural product.

That is if, for example, a wood knot appears in a design the final product is adapted to that design by providing an area having a volumetric, conceptual, and physical correspondence, both visual and textual, with a wood knot. A similar thing happens if there is a wood pore, a stone roughness, or bubbles on a ceramic.

The foregoing is achieved using an exact correspondence-concordance between the image on the impregnated papers and the relief texture of a press mold.

Example,
   a). Ceramic tiles in which the unions (joints) between tiles are relieved to produce a paving of earthenware ceramics;
   b). Wood designs where the streaks, pores, and knots of a paper design coincide with the surface texture.

In short, products with a very marked surface texture that adapts and corresponds to the design on a resin impregnated paper. What is achieved is a more realistic affect than when the surface texture does not adapt and correspond to the design on a resin impregnated paper. Not only is an optical effect created, but also the different reliefs, which appear in the correct areas, can be touched.

Also, the product's life increases as relieved joints do not undergo wear. This is because the relieved joints are not contacted when being trod upon.

This invention advocates new direct laminated flooring of cellulose sheets impregnated with polymerizable resins and having design characteristics, and that, once pressed, have offset/sunk areas in peripheral edges.

This invention is also characterized because the optical/tactile texture of the surface of the floor, once pressed, corresponds and adapts to the characteristics designed on cellulose sheets.

BRIEF DESCRIPTION OF THE DRAWINGS

To understand this invention better, a preferential way of practical execution is illustrated on the drawings, which are subject to accessory changes that take nothing away from their basic content.

FIG. 1 is a plan view of a design on a resin-impregnated paper before a product with that design is pressed and cut.

FIG. 2 is a plan view of a product that uses the resin-impregnated paper of FIG. 1, after that product is pressed.

FIG. 3 cross-sectional view taken along line A—A of FIG. 2.

DETAILED DESCRIPTION OF THE ILLUSTRATED EMBODIMENTS

An example of a practical execution of this invention, but not a limiting one, is described below.

This type of product usually has cellulose cores impregnated by polymerizable resins (such as phenols), in particular by melamine. The core may include wooden sheets or other products, such as silica, that resist abrasion.

A product has a rim area, as illustrated in FIG. 1, which may be a different color than the remainder of the product. The rim gives rise to a relieved perimeter rim 1 after pressing (see FIG. 2).

Turning now to FIG. 2, the pressed product unit 4, which is to be used in a paving, has a perimeter rim 1 that is sunk below the rest of the surface S of the product unit. The perimeter rim 1 forms a joint 2 as shown in FIG. 3. The joint 2 can be formed using numerous procedures, for example, tongue and groove.

The (mechanized) cutting, or quartering, of the first board is performed by a press and can be done in units (strips) of, for example, 300×300 mm, or 400×400 mm, or 600×600 mm. Several units can be maintained together in blocks of, for example, 1,200×300 mm. (four units) or 1,200×400 mm (three units).

According to the principles of the present invention, the pressed board attempts to imitate another product. In the illustrated embodiment the product unit 4 imitates a ceramic, thus two deformities (a) and (b) that are similar to those of a ceramic are produced. It should be understood that the deformities extend normal to the surface of the product unit 4.

As ceramic tiles are usually butt joined with a small layer of cement, it will be seen that the perimeter rim 1 successfully imitates that of a ceramic tile, both by touch and sight. This is due to its offset, and possibly by adding a cement color to the design of the cellulose papers (of FIG. 1).

Turning now to FIG. 3, if a user treads between product unit 4 tiles the sole 3 of the user's shoe never reaches the perimeter rim edge (a).

It can be seen that once the characteristics ($a_1$) and ($b_1$) of the product to be imitated (ceramic) have been defined in the design drawing of a paper (FIG. 1), the volume-relief-texture (deformities) in the end product at (a) and (b), reference FIG. 2, correspond perfectly with respect to the position, concept, physical aspects, and volume to the design drawing characteristics ($a_1$) and ($b_1$) of the product to be imitated.

In the specific case of the perimeter rim 1, those of a ceramic tile can be considered.

Further mechanizing (working) of the product (flooring) that comes from the press usually includes dividing it into units (strips) that are to be placed on a floor, and in providing the units (if necessary) with connection means, for example, tongue and groove features.

This mechanizing is not the object of the invention.

What is claimed is:

1. A laminated material comprising cellulose sheets impregnated with a polymer resin that are mechanically pressed and cut into a product, wherein the product includes a surface with both a perimeter area having an edge contour and an interior region, wherein the perimeter area is relieved such that the edge contour is below the interior region.

2. A laminated material according to claim 1, wherein the edge contour is less than a millimeter below the interior region.

3. A laminated material according to claim 1, wherein the surface is polygon shaped.

4. A laminated material according to claim 1, wherein the surface is rectangular.

5. A laminated material according to claim 1, wherein the surface is square.

6. A laminated material according to claim 1, wherein the surface is formed from a cellulose sheet having a visual pattern that imitates another product.

7. A laminated material according to claim 1, wherein the surface is mechanically formed with a surface texture that varies in accordance with the visual pattern.

8. A laminated material according to claim 1, wherein the surface visually depicts wood.

9. A laminated material according to claim 1, wherein the surface visually depicts ceramic.

10. A laminated material according to claim 1, wherein the surface visually depicts stone.

11. A laminated material according to claim 1, wherein the product is a board.

12. A laminated material according to claim 1, wherein the product is a floorboard.

13. A laminated material according to claim 1, wherein the product is a wall panel.

14. A laminated material according to claim 1, wherein the product further includes sidewalls that extend down from said edge contours to a rim.

15. A laminated material according to claim 14, wherein the rim is formed by mechanical pressing.

16. A laminated material according to claim 15, wherein the rim mates with another laminated material product.

17. A laminated material comprising cellulose sheets impregnated with a polymer resin that are pressed and cut to form a product, wherein the product includes a surface formed from a cellulose sheet having a visual pattern that imitates another product, and wherein the surface is mechanically formed to have a surface texture that varies in accord with the visual pattern.

18. A laminated material according to claim 17, wherein the surface is polygon shaped.

19. A laminated material according to claim 18, wherein the surface is rectangular.

20. A laminated material according to claim 18, wherein the surface is square.

21. A laminated material according to claim 17, wherein the surface visually depicts wood.

22. A laminated material according to claim 17, wherein the surface visually depicts ceramic.

23. A laminated material according to claim 17, wherein the surface visually depicts stone.

24. A laminated material according to claim 17, wherein the product is a board.

25. A laminated material according to claim 24, wherein the product is a floorboard.

26. A laminated material according to claim 17, wherein the product is a wall panel.

27. A laminated material according to claim 17, wherein the product further includes sidewalls that extend down from the surface to a rim.

28. A laminated material according to claim 27, wherein the rim is formed by mechanical pressing.

29. A laminated material according to claim 27, wherein the rim mates with another product.

30. A laminated material according to claim 17, wherein the surface includes a perimeter area having an edge contour and an interior region, wherein the perimeter area is relieved such that the edge contour is below the interior region.

31. A laminated material according to claim 30, wherein the edge contour is less than a millimeter below the interior region.

32. A laminated material according to claim 17, wherein the surface texture includes a concave feature.

33. A laminated material according to claim 17, wherein the surface texture includes a convex feature.

34. A laminated material according to claim 17, wherein the surface texture includes surface roughness.

35. A laminated material comprised of polymer impregnated sheets of which a polymer-impregnated sheet includes a visual pattern, wherein the polymer-impregnated sheet is embossed in registration with the visual pattern.

36. A laminated material according to claim 35, wherein the visual pattern depicts a building product having surface texture.

37. A laminated material according to claim 36, wherein the embossing coincides with the visual pattern to produce a surface texture that corresponds to that of the building product.

38. A laminated material according to claim 37, wherein the building product is wood.

39. A laminated material according to claim 37, wherein the building product is ceramic.

40. A laminated material according to claim 37, wherein the building product is stone.

41. A laminated material according to claim 37, wherein embossing is performed by mechanical pressing.

42. A laminated material according to claim 37, wherein the surface includes a perimeter area having an edge contour and an interior region, wherein the perimeter area is relieved such that the edge contour is below the interior region.

43. A laminated material according to claim 42, wherein the edge contours is less than a millimeter below the interior region.

44. A laminated material according to claim 37, wherein the surface texture includes a concave feature.

45. A laminated material according to claim 37, wherein the surface texture includes a convex feature.

46. A laminated material according to claim 17, wherein the surface texture is characterized by a surface roughness.

47. A laminated material for floors comprising polymer impregnated sheets of which a polymer impregnated sheet includes a visual pattern, the laminated material having a surface with texture-relief corresponding to the visual pattern, the texture-relieve corresponding to the visual pattern providing visual and tactile feeling of a natural product.

48. A laminated material according to claim 47, wherein the natural product includes ceramic.

49. A laminated material according to claim 47, wherein the natural product includes wood.

* * * * *

(12) INTER PARTES REEXAMINATION CERTIFICATE (1029th)
United States Patent
Garcia

(10) Number: US 6,401,415 C1
(45) Certificate Issued: Jan. 15, 2015

(54) DIRECT LAMINATED FLOOR

(75) Inventor: Eugenio Cruz Garcia, Gandia (ES)

(73) Assignee: Faus Group, Inc., Dalton, GA (US)

Reexamination Request:
No. 95/001,515, Dec. 23, 2010

Reexamination Certificate for:
Patent No.: 6,401,415
Issued: Jun. 11, 2002
Appl. No.: 09/460,117
Filed: Dec. 13, 1999

(30) Foreign Application Priority Data

Nov. 5, 1999 (ES) .................................. P-9902432

(51) Int. Cl.
*E04F 15/00* (2006.01)

(52) U.S. Cl.
USPC ................ 52/311.1; 52/313; 52/315; 52/316; 52/392

(58) Field of Classification Search
None
See application file for complete search history.

(56) References Cited

To view the complete listing of prior art documents cited during the proceeding for Reexamination Control Number 95/001,515, please refer to the USPTO's public Patent Application Information Retrieval (PAIR) system under the Display References tab.

*Primary Examiner* — Jeffrey R Jastrzab

(57) ABSTRACT

New direct laminated floor, of the kind that contain, on their surface, cellulose sheets impregnated in polymerisable resins, on which some characteristics have been drawn and where, once pressed and mechanised, the finished strips have an offset/sunk area on the peripheral edge and the optic/tactile texture of the surface corresponds and adapts to the characteristics drawn on the cellulose sheets.
For application in the construction industry.

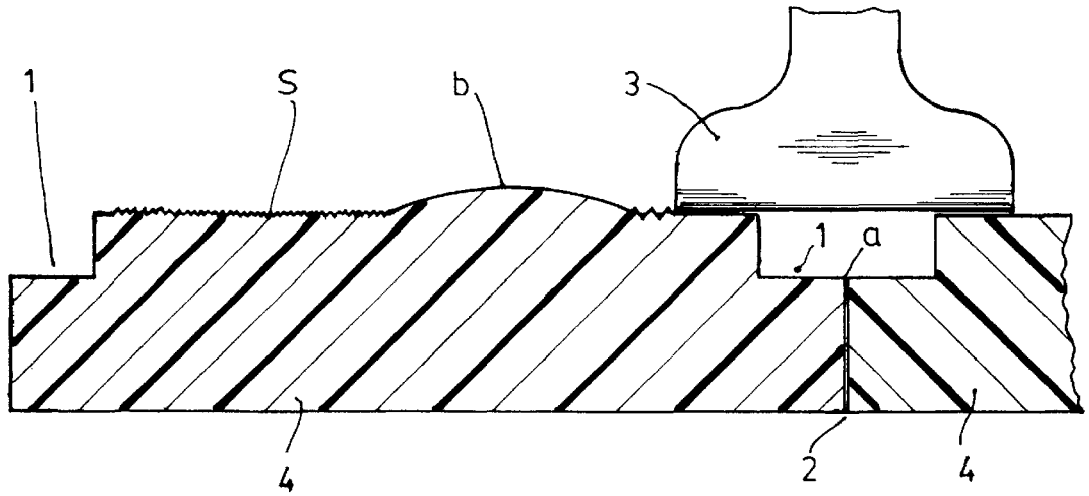

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-49 are cancelled.

\* \* \* \* \*